(12) United States Patent
Loesch et al.

(10) Patent No.: US 9,777,078 B2
(45) Date of Patent: Oct. 3, 2017

(54) METHOD FOR PRODUCING WATER-ABSORBING POLYMER PARTICLES BY POLYMERIZING DROPLETS OF A MONOMER SOLUTION

(75) Inventors: Dennis Loesch, Altrip (DE); Volker Seidl, Mannheim (DE); Matthias Weismantel, Jossgrund-Oberndorf (DE)

(73) Assignee: BASF SE, Ludwigshafen (DE)

( * ) Notice: Subject to any disclaimer, the term of this patent is extended or adjusted under 35 U.S.C. 154(b) by 982 days.

(21) Appl. No.: 12/373,627

(22) PCT Filed: Jul. 12, 2007

(86) PCT No.: PCT/EP2007/057140
§ 371 (c)(1),
(2), (4) Date: Jan. 13, 2009

(87) PCT Pub. No.: WO2008/009611
PCT Pub. Date: Jan. 24, 2008

(65) Prior Publication Data
US 2009/0318582 A1 Dec. 24, 2009

(30) Foreign Application Priority Data

Jul. 19, 2006 (EP) ..................................... 06117492

(51) Int. Cl.
| C08F 2/10 | (2006.01) |
| C08F 2/50 | (2006.01) |
| C08F 4/04 | (2006.01) |
| C08F 220/06 | (2006.01) |
| C08F 2/00 | (2006.01) |
| C08F 4/00 | (2006.01) |
| C08F 4/34 | (2006.01) |
| C08F 222/10 | (2006.01) |

(52) U.S. Cl.
CPC .................. *C08F 2/10* (2013.01); *C08F 2/00* (2013.01); *C08F 2/50* (2013.01); *C08F 4/00* (2013.01); *C08F 4/04* (2013.01); *C08F 4/34* (2013.01); *C08F 220/06* (2013.01); *C08F 222/1006* (2013.01)

(58) Field of Classification Search
CPC ...... C08F 2/34; C08F 4/04; C08F 4/40; C08F 220/18; C08F 2/10; C08F 2/50; C08F 2/00; C08F 4/00; C08F 220/06; C08F 4/34; C08F 222/1006; A61F 13/00; A61L 15/225; A61L 15/24
USPC ........................ 522/184; 526/227, 230, 219.2
See application file for complete search history.

(56) References Cited

U.S. PATENT DOCUMENTS

| 5,145,906 | A | | 9/1992 | Chambers et al. |
| 5,269,980 | A | | 12/1993 | Levendis et al. |
| 5,624,967 | A | * | 4/1997 | Hitomi et al. ................... 521/64 |
| RE37,021 | E | | 1/2001 | Aida |
| 6,951,911 | B2 | | 10/2005 | Tagawa et al. |
| 2003/0208022 | A1 | | 11/2003 | Nakamura et al. |
| 2004/0167487 | A1 | * | 8/2004 | Tamburro et al. ............. 604/367 |
| 2004/0220350 | A1 | * | 11/2004 | Smith ......................... C08J 3/12 |
| | | | | 525/328.2 |
| 2006/0217508 | A1 | * | 9/2006 | Schmid et al. ............. 526/317.1 |
| 2007/0100115 | A1 | | 5/2007 | Schmid et al. |
| 2008/0045625 | A1 | | 2/2008 | Losch et al. |
| 2008/0125533 | A1 | * | 5/2008 | Riegel et al. .................. 524/417 |
| 2008/0188586 | A1 | * | 8/2008 | Bruhns et al. ................. 522/153 |

FOREIGN PATENT DOCUMENTS

| CA | 2370380 A1 | 10/2000 |
| DE | 103 14 466 A1 | 10/2004 |
| DE | 103 40 253 A1 | 3/2005 |
| DE | 10 2004 024 437 A1 | 12/2005 |
| EP | 0 348 180 A2 | 12/1989 |
| JP | H11335404 A | 12/1999 |
| WO | WO-94/20547 A1 | 9/1994 |
| WO | WO-95/05856 A1 | 3/1995 |
| WO | WO-96/40427 A1 | 12/1996 |
| WO | WO-99/25393 A2 | 5/1999 |
| WO | WO-00/63295 A1 | 10/2000 |
| WO | WO-03/051940 A1 | 6/2003 |
| WO | WO-2004/085496 A1 | 10/2004 |
| WO | WO-2005/056177 A1 | 6/2005 |
| WO | WO-2006/024368 A1 | 3/2006 |
| WO | WO 2006/079631 | * 3/2006 | ................ C08F 2/34 |

OTHER PUBLICATIONS

Buchholz et al., Modern Superabsorbent Polymer Technology, Wiley-VCH, 71-103 (1998).
International Search Report in PCT/EP2007/057140 dated Oct. 29, 2007.
Abstract and machine translation of JP H11-335404.
Buchholz et al., *Modern Superabsorbent Polymer Technology*, Wiley-VCH (1998), pp. 114-115, 152-153, 158-161, 212-213.
Research disclosure, No. RD37243, "Grinding of Water Containing Pasty Gels to Improve Drying," undated, by an unknown author, including a citation to one reference dated as late as 1993.
*Ullmann's Encyclopedia of Industrial Chemistry*, 6th ed.; Wiley VCH: New York, 1999 (including enlargement of Figure 7).

\* cited by examiner

*Primary Examiner* — Michael Pepitone
*Assistant Examiner* — Jessica Roswell
(74) *Attorney, Agent, or Firm* — Marshall, Gerstein & Borun LLP

(57) ABSTRACT

A process for producing water-absorbing polymer particles by polymerizing droplets of a monomer solution, where the monomer solution comprises at least two initiators, one of the initiators is a peroxide with the exception of persulfate, and the molar ratio of peroxide to further initiator is at least 1:8, the water-absorbing polymer particles themselves, and hygiene articles comprising these water-absorbing polymer particles.

11 Claims, No Drawings

METHOD FOR PRODUCING WATER-ABSORBING POLYMER PARTICLES BY POLYMERIZING DROPLETS OF A MONOMER SOLUTION

CROSS-REFERENCE TO RELATED APPLICATIONS

This is the U.S. national phase of International Application No. PCT/EP2007/057140, filed Jul. 12, 2007, which claims the benefit of European Patent Application No. 06117492.6, filed Jul. 19, 2006.

The present invention relates to a process for producing water-absorbing polymer particles by polymerizing droplets of a monomer solution which comprises at least two initiators, to the water-absorbing polymer particles themselves, and to hygiene articles comprising these water-absorbing polymer particles.

Further embodiments of the present invention can be taken from the claims, the description and the examples. It is self-evident that the features of the inventive subject-matter which have been mentioned above and are yet to be illustrated below can be used not only in the combinations specified in each case but also in other combinations without leaving the scope of the invention.

The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also water-retaining agents in market gardening.

The properties of the water-absorbing polymers can be adjusted via the degree of crosslinking. Gel strength rises and absorption capacity falls with increasing degree of crosslinking. This means that the Centrifuge Retention Capacity (CRC) decreases with increasing Absorbency Under Load (AUL) (at very high degrees of crosslinking, Absorbency Under Load decreases again too).

To improve the performance properties, for example Saline Flow Conductivity (SFC) in the diaper and Absorbency Under Load (AUL), water-absorbing polymer particles are generally postcrosslinked. This increases only the degree of crosslinking of the particle surface, as a result of which Absorbency Under Load (AUL) and Centrifuge Retention Capacity (CRC) can be decoupled at least partly. This postcrosslinking can be carried out in aqueous gel phase. Preferably, however, ground and sieved particles of the base polymer are surface coated with a postcrosslinker, thermally postcrosslinked and dried. Crosslinkers suitable for this purpose are compounds which comprise at least two groups which can form covalent bonds with the carboxylate groups of the hydrophilic polymer.

By virtue of spray polymerization, the process steps of polymerization and drying can be combined. In addition, the particle size can be adjusted within certain limits by suitable process control.

The production of water-absorbing polymer particles by polymerizing droplets of a monomer solution is described, for example, in EP-A-0 348 180, WO-A-96/40427, U.S. Pat. No. 5,269,980, DE-A-103 14 466, DE-A-103 40 253 and DE-A-102004024437.

It was an object of the present invention to provide an improved process for producing water-absorbing polymer particles.

The object is achieved by a process for producing water-absorbing polymer particles by polymerizing droplets of a monomer solution comprising
a) at least one water-soluble ethylenically unsaturated monomer,
b) if desired, a crosslinker,
c) at least one initiator,
d) at least one further initiator and
e) water,
wherein the initiator c) is a peroxide with the exception of persulfate and the molar ratio of initiator c) to initiator d) is at least 1:8.

The monomers a) are water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

The concentration of the monomers a) in the monomer solution is typically from 2 to 80% by weight, preferably from 5 to 70% by weight, more preferably from 10 to 60% by weight.

Suitable monomers a) are, for example, ethylenically unsaturated carboxylic acids such as acrylic acid or derivatives thereof, such as acrylamide. Particular preference is given to acrylic acid.

The acid groups of the monomers a) have typically been neutralized partly, preferably to an extent of from 25 to 85 mol %, preferentially to an extent of from 50 to 80 mol %, more preferably to an extent of from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred alkali metals, but very particular preference is given to sodium hydroxide, sodium carbonate or sodium hydrogencarbonate and mixtures thereof. Typically, the neutralization is achieved by mixing in the neutralizing agent as an aqueous solution, as a melt or else preferably as a solid. For example, sodium hydroxide may be present with a water content significantly below 50% by weight as a waxy mass with a melting point above 23° C. In this case, metering as piece material or a melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

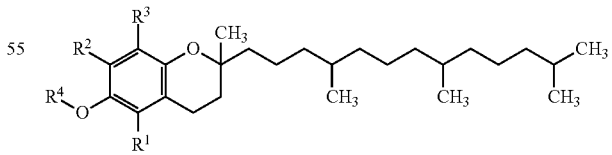

where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3=$methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

The crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0 547 847, EP-A-0 559 476, EP-A-0 632 068, WO-A-93/21237, WO-A-03/104299, WO-A-03/104300, WO-A-03/104301 and in DE-A-103 31 450, mixed acrylates which, as well as acrylate groups, comprise further ethylenically unsaturated groups, as described in DE-A-103 314 56 and the prior German application with the reference number 10355401.7, or crosslinker mixtures, as described, for example, in DE-A-195 43 368, DE-A-196 46 484, WO-A-90/15830 and WO-A-02/32962.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP-A-0 343 427. Further crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or propoxylated glycerols which have been esterified with acrylic acid or methacrylic acid to give di- or triacrylates, as described, for example in WO-A-03/104301. Di- and/or triacrylates of 3- to to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol. These feature particularly low residual contents (typically below 10 ppm) in the water-absorbing polymer, and the aqueous extracts of the water-absorbing polymers thus produced have an almost unchanged surface tension (typically at least 0.068 N/m) in comparison to water at the same temperature.

Based on the monomer a), preferably less than 0.5% by weight, more preferably less than 0.3% by weight, most preferably less than 0.15% by weight, of crosslinkers b) are used.

Suitable initiators c) are hydrogen peroxide and organic peroxides such as acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcyclohexyl) peroxydicarbonate, dimyristyl peroxydicarbonate, diacetyl peroxydicarbonate, allyl perester, cumyl peroxyneodecanoate, tert-butyl per-3,5,5-trimethylhexanoate, acetylcyclohexylsulfonyl peroxide, dilauryl peroxide, dibenzoyl peroxide and tert-amyl perneodecanoate.

Particularly preferred initiators c) are hydroperoxides such as hydrogen peroxide and tert-butyl hydroperoxide.

In order that the initiators c) do not decompose prematurely, for example catalyzed by traces of iron ions, a complexing agent is advantageously added to the monomer solution, for example the sodium salt of ethylenediaminetetraacetic acid. The concentration of the complexing agent in the monomer solution is preferably from 0.005 to 0.5% by weight, more preferably 0.01 to 0.1% by weight, most preferably from 0.03 to 0.05% by weight.

The initiators d) used may be all compounds which decompose to free radicals under the polymerization conditions, for example photoinitiators, azo compounds and redox initiators. Preference is given to use of water-soluble initiators.

The polymerization is preferably induced by the action of energy-rich radiation, in which case it is customary to use photoinitiators as initiators d). Useful photoinitiators include, for example, α-splitters, H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds, such as the free radical formers mentioned above, substituted hexaarylbisimidazoles or acylphosphine oxides, especially 2-hydroxy-2-methylpropiophenone (Darocure® 1173). Examples of azides are 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl)maleimide, N-acetyl-4-sulfonylazidoaniline, 4-sulfonylazido-aniline, 4-azidoaniline, 4-azidophenacyl bromide, p-azidobenzoic acid, 2,6-bis(p-azidobenzylidene)cyclohexanone and 2,6-bis(p-azidobenzylidene)-4-methylcyclohexanone.

Particularly preferred initiators d) are azo compounds, examples being 2,2'-azobisisobutyronitrile, 2,2'-azobis(2,4-dimethylvaleronitrile) and 2,2'-azobis(4-methoxy-2,4-dimethylvaleronitrile), especially water-soluble azo compounds, examples being 2,2'-azobis{2-[1-(2-hydroxyethyl)-2-imidazolin-2-yl]propane}dihydrochloride, 2,2'-azobis-(2-amidinopropane) dihydrochloride, 2,2'-azobis[2-(2-imidazolin-2-yl)propane]dihydrochloride and 2,2'-azobis[2-(5-methyl-2-imidazolin-2-yl)propane]dihydrochloride. Very particular preference is given to 2,2'-azobis[2-(2-imidazolin-2-yl)propane]dihydrochloride and 2,2'-azobis[2-(5-methyl-2-imidazolin-2-yl)propane]dihydrochloride.

Preference is given to using azo compounds and/or photoinitiators as initiators d).

The initiators are used in customary amounts, for example in amounts of from 0.001 to 5% by weight, preferably from 0.01 to 1% by weight, based on the monomers a).

The molar ratio of initiator c) to initiator d) is preferably at least 1:2, more preferably at least 1:1, most preferably at least 2:1.

For optimal action, the preferred polymerization inhibitors require dissolved oxygen. The monomer solution can therefore be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The polymerization inhibitors may also be removed by absorption, for example on activated carbon.

For the polymerization in the gas phase, the monomer solution can be sprayed or dropletized.

In the process according to the invention, one or more spray nozzles may be used. The useable spray nozzles are subject to no restriction. The liquid to be sprayed can be fed under pressure to such nozzles. The liquid to be sprayed can be atomized in such a way that it is decompressed in the nozzle bore after it has attained a certain minimum speed. For the inventive purpose, it is also possible to use one-material nozzles, for example slot dies or swirl chambers (full-cone nozzles) (for example from Düsen-Schlick GmbH, Germany, or from Spraying Systems Deutschland GmbH, Germany).

Preference is given in accordance with the invention to full-cone nozzles. Among these, preference is given to those having an opening angle of the spray cone of from 60 to 180°. Particular preference is given to opening angles of from 90 to 120°. The mean droplet diameter which is established in the course of spraying is, in accordance with the invention, typically less than 1000 µm, preferably less than 200 µm, more preferably less than 100 µm, and typically greater than 10 µm, preferably greater than 20 µm, more preferably greater than 50 µm, and can be determined by customary methods such as light scattering, or on the basis of the characteristics obtainable from the nozzle manufacturers. The throughput per spray nozzle is appropriately from 0.1 to 10 m³/h, frequently from 0.5 to 5 m³/h.

The droplet diameter which is established in the course of spraying is appropriately from 10 to 1000 µm, preferably from 10 to 500 µm, more preferably from 10 to 150 µm, most preferably from 10 to 45 µm.

The dropletization involves metering a monomer solution into the gas phase to form droplets. The dropletization of the monomer solution can be carried out, for example, by means of a dropletizer plate.

A dropletizer plate is a plate having at least one drillhole, the liquid entering the drillhole from the top. The dropletizer plate or the liquid is oscillated, which generates a chain of ideally monodispersed droplets at each drillhole on the underside of the dropletizer plate.

The number and size of the drillholes is selected according to the desired capacity and droplet size. The droplet diameter is typically 1.9 times the diameter of the drillhole.

What is important here is that the liquid to be dropletized does not pass through the drillhole too rapidly and the pressure drop over the drillhole is not too great. Otherwise, the liquid is not dropletized, but rather the liquid jet is broken up (sprayed) owing to the high kinetic energy. The speed with which the monomer solution passes through the drillhole is preferably less than 0.2 m/s, more preferably less than 0.1 m/s, most preferably less than 0.05 m/s. The pressure drop over the drillhole is preferably less than 1 bar, more preferably less than 0.5 bar, most preferably less than 0.3 bar.

The dropletizer plate has typically at least one drillhole, preferably at least 10, more preferably at least 50 and typically up to 10 000 drillholes, preferably up to 5000, more preferably up to 1000 drillholes, the drillholes typically being distributed uniformly over the dropletizer plate, preferably in so-called triangular pitch, i.e. three drillholes in each case form the corners of an equilateral triangle.

The diameter of the drillholes is adjusted to the desired droplet size. The mean diameter of the droplets is typically at least 100 µm, preferably at least 150 µm, more preferably at least 200 µm, and typically up to 2000 µm, preferably up to 1200 µm, more preferably up to 600 µm. The proportion of the droplets having a diameter of less than 100 µm is preferably at least 80% by weight, more preferably at least 90% by weight, most preferably at least 95% by weight.

It may be advantageous to place the dropletizer plate onto a carrier plate, the carrier plate likewise having drillholes. In this case, the drillholes of the carrier plate have a greater diameter than the drillholes of the dropletizer plate and are arranged such that below each drillhole of the dropletizer plate is disposed a concentric drillhole of the carrier plate. This arrangement enables a rapid change of the dropletizer plate, for example in order to generate droplets of another size. Such a system composed of dropletizer plate and carrier plate is considered to be a dropletizer plate in the context of this invention, i.e. the underside of the dropletizer plate/carrier plate system is the underside of the dropletizer plate.

However, the dropletization can also be carried out by means of pneumatic drawing dies, rotation, cutting of a jet or rapidly actuable microvalve dies.

In a pneumatic drawing die, a liquid jet together with a gas stream is accelerated through a hole diaphragm. The gas rate can be used to influence the diameter of the liquid jet and hence the droplet diameter.

In the case of dropletization by rotation, the liquid passes through the orifices of a rotating disc. As a result of the centrifugal force acting on the liquid, droplets of defined size are torn off. Rotary dropletization is described, for example, in DE-A 4308842 and U.S. Pat. No. 6,338,438.

The emerging liquid jet can also be cut into defined segments by means of a rotating blade. Each segment then forms a droplet.

In the case of microvalve nozzles, droplets with defined liquid volume are generated directly.

Preference is given to dropletization over spraying, especially when photoinitiators are used.

The polymerization is preferably carried out in a laminar gas flow. A laminar gas flow is a gas flow in which the individual layers of the flow do not mix but rather move in parallel. A measure of the flow conditions is the Reynolds number (Re). Below a critical Reynolds number ($Re_{crit}$) of 2300, the gas flow is laminar. The Reynolds number of the laminar gas flow is preferably less than 2000, more preferably less than 1500, most preferably less than 1000. The lower limiting case of the laminar inert gas flow is a standing inert gas atmosphere (Re=0), i.e. inert gas is not fed in continuously.

The reaction is preferably carried out in the presence of an inert carrier gas, inert meaning that the carrier gas cannot react with the constituents of the monomer solution. The inert carrier gas is preferably nitrogen. The oxygen content of the inert carrier gas is advantageously below 5% by volume, preferably below 2% by volume, more preferably below 1% by volume.

The inert carrier gas can be conducted through the reaction space in cocurrent or in countercurrent to the free-falling droplets of the monomer solution, preferably in cocurrent. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3%, most preferably up to 1%.

The gas velocity is preferably adjusted such that the flow in the reactor is directed, for example no convection currents opposed to the general flow direction are present, and is, for example, from 0.1 to 2 m/s, preferably from 0.5 to 1.8 m/s, more preferably from 1 to 1.5 m/s.

The temperature in the reaction chamber in the case of thermally induced polymerization is preferably from 70 to 250° C., more preferably from 100 to 200° C., most preferably from 120 to 180° C.

The carrier gas is appropriately preheated to the reaction temperature upstream of the rector.

The reaction can be carried out under elevated pressure or under reduced pressure; preference is given to a reduced pressure of up to 100 mbar relevant to ambient pressure.

The reaction offgas, i.e. the carrier gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh carrier gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The reaction product can be withdrawn from the reactor in a customary manner, preferably at the bottom by means of a conveying screw, and, if appropriate, dried down to the desired residual moisture content and to the desired residual monomer content.

In the process according to the invention, preferably relatively slow initiators c) are combined with preferably more rapid initiators d). The initiators d) bring about a rapid start to the polymerization and a sufficiently high conversion. The initiators c) do not decompose until later and bring about crosslinking of the polymer chain by grafting reactions. These grafting reactions appear to take place preferentially at the phase interface, so that polymer particles with a highly crosslinked coating are obtained.

The initiators c) usable in accordance with the invention are, in these desired crosslinking reactions, more effective than, for example, persulfates. Moreover, persulfates form sparingly soluble precipitates with the azo compounds particularly preferred in accordance with the invention, said precipitates tending to spontaneous decomposition especially in the dry state.

This means that the process according to the invention enables the production of structured polymer particles as have been obtainable to date only by additional postcrosslinking.

Of course, the polymer particles can subsequently be agglomerated and/or postcrosslinked.

Suitable agglomeration assistants are water and water-miscible organic solvents such as alcohols, tetrahydrofuran and acetone, and it is additionally possible to use water-soluble polymers.

Suitable postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyglycidyl compounds, as described in EP-A-0 083 022, EP-A-0 543 303 and EP-A-0 937 736, di- or polyfunctional alcohols as described in DE-C-33 14 019, DE-C-35 23 617 and EP-A-0 450 922, or β-hydroxyalkylamides, as described in DE-A-102 04 938 and U.S. Pat. No. 6,239,230.

In addition, DE-A-40 20 780 describes cyclic carbonates, DE-A-198 07 502 describes 2-oxazolidone and its derivatives such as 2-hydroxyethyl-2-oxazolidone, DE-A-198 07 992 describes bis- and poly-2-oxazolidinones, DE-A-198 54 573 describes 2-oxotetrahydro-1,3-oxazine and its derivatives, DE-A-198 54 574 describes N-acyl-2-oxazolidones, DE-A-102 04 937 describes cyclic ureas, DE-A-103 34 584 describes bicyclic amide acetals, EP-A-1 199 327 describes oxetanes and cyclic ureas, and WO-A-03/031482 describes morpholine-2,3-dione and its derivatives, as suitable postcrosslinkers.

The present invention further provides water-absorbing polymer particles which are obtainable by the process according to the invention.

The present invention also provides water-absorbing polymer particles which have not been postcrosslinked and which have an Absorbency Under Load of 4.83 kPa of from 20 to 30 g/g, preferably of at least 22 g/g, more preferably of at least 24, most preferably of at least 26 g/g. The Absorbency Under Load of 4.83 kPa (AUL) is determined in accordance with the EDANA (European Disposables and Nonwovens Association) recommended test method No. 442.2-02 "Absorption under pressure".

The inventive water-absorbing polymer particles typically have a Centrifuge Retention Capacity (CRC) of from 22 to 45 g/g, preferably at least 25 g/g, more preferably at least 30 g/g. The Centrifuge Retention Capacity (CRC) is determined in accordance with the EDANA (European Disposables and Nonwovens Association) recommended test method No. 441.2-02 "Centrifuge retention capacity".

The inventive water-absorbing polymer particles have typically less than 10% by weight, preferably less than 8% by weight, more preferably less than 6% by weight, of extractables. The extractables are determined in accordance with the EDANA (European Disposables and Nonwovens Association) recommended test method No. 470.2-02 "Extractables".

The inventive water-absorbing polymer particles typically have a water content of less than 10% by weight, preferably less than 5% by weight, more preferably less than 2% by weight. The water content is determined in accordance with the EDANA (European Disposables and Nonwovens Association) recommended test method No. 430.2-02 "Moisture content".

The present invention further provides processes for producing hygiene articles, especially diapers, comprising the use of water-absorbing polymer particles produced by the abovementioned process.

The present invention further provides for the use of inventive water-absorbing polymer particles in hygiene articles, for thickening wastes, especially medical wastes, or as a water-retaining agent in market gardening.

The present invention further provides hygiene articles comprising an absorbing layer consisting of from 30 to 100% by weight, preferably from 60 to 100% by weight, preferentially from 70 to 100% by weight, more preferably from 80 to 100% by weight, most preferably from 90 to 100% by weight, of inventive water-absorbing polymer particles, the coating of the absorbing layer of course not being included.

To determine the goodness of the postcrosslinking, the dried water-absorbing polymer particles are tested with the test methods described below.

Methods:

The measurements should, unless stated otherwise, be carried out at an ambient temperature of 23±2° C. and a relative atmospheric humidity of 50±10%. The water-absorbing polymers are mixed thoroughly before the measurement.

Residual Monomers

The residual monomers of the water-absorbing polymer particles are determined in accordance with the EDANA (European Disposables and Nonwovens Association) recommended test method No. 410.2-02 "Residual monomers".

Centrifuge Retention Capacity (CRC)

The Centrifuge Retention Capacity of the water-absorbing polymer particles is determined in accordance with the EDANA (European Disposables and Nonwovens Association) recommended test method No. 441.2-02 "Centrifuge retention capacity".

Absorbency Under Load (AUL)

The Absorbency Under Load of the water-absorbing polymer particles is determined in accordance with the EDANA (European Disposables and Nonwovens Association) recommended test method No. 442.2-02 "Absorption under pressure".

Extractables

The extractable fractions of the water-absorbing polymer particles are determined in accordance with the EDANA (European Disposables and Nonwovens Association) recommended test method No. 470.2-02 "Extractables".

The EDANA test methods are obtainable, for example, from the European Disposables and Nonwovens Association, Avenue Eugenè Plasky 157, B-1030 Brussels, Belgium.

EXAMPLES

Example 1 (Comparative)

14.275 kg of sodium acrylate (37.5% by weight solution in water) and 1.367 kg of acrylic acid are mixed with 0.358 kg of water, 22 g of 15-tuply ethoxylated trimethylolpropane triacrylate and 80 g of EDTA (10% by weight of the sodium salt of ethylenediaminetetraacetic acid in water). After addition of 33 g of 2,2'-azobis[2-(2-imidazolin-2-yl)propane] dihydrochloride (3% by weight solution in water), the solution was dropletized into a preheated dropletizing tower filled with a nitrogen atmosphere (180° C., height 12 m, width 2 m, gas velocity 0.1 m/s in cocurrent). The metering velocity was 16 kg/h. The dropletizer plate had 37 drillholes of 170 μm. The diameter of the dropletizer plate was 65 mm. The initiator was mixed with the monomer solution by means of a static mixer just upstream of the dropletizer.

The water-absorbing polymer particles had the following properties:

| Residual monomers | 0.19% by weight |
|---|---|
| CRC: | 40 g/g |
| AUL0.7 psi | 16 g/g |
| Extractables | 12% by weight |

Example 2

The procedure of Example 1 was repeated. In addition, 55 g of hydrogen peroxide (3% by weight solution in water) were metered in.

The water-absorbing polymer particles had the following properties:

| Residual monomers | 0.16% by weight |
|---|---|
| CRC: | 36 g/g |
| AUL0.7 psi | 20 g/g |
| Extractables | 9% by weight |

Example 3

The procedure of Example 1 was repeated. In addition, 110 g of hydrogen peroxide (3% by weight solution in water) were metered in.

The water-absorbing polymer particles had the following properties:

| Residual monomers | 0.12% by weight |
|---|---|
| CRC: | 33 g/g |
| AUL0.7 psi | 25 g/g |
| Extractables | 7% by weight |

What is claimed is:

1. A process for producing water-absorbing polymer particles comprising providing droplets of a monomer solution in a carrier gas, the monomer solution comprising
    a) at least one water-soluble ethylenically unsaturated monomer,
    b) a crosslinker,
    c) at least one peroxide initiator with the exception of persulfate, wherein the at least one peroxide initiator consists of hydrogen peroxide and an organic peroxide,
    d) at least one further initiator wherein the further initiator d) is selected from the group consisting of an azo compound and/or a photoinitiator and/or a redox initiator, and
    e) water,
    wherein the molar ratio of initiator c) to further initiator d) is at least 16:1, and
polymerizing the droplets of the monomer solution in the carrier gas surrounding the droplets,
    wherein the monomer solution is metered into the carrier gas at a speed of less than 0.2 m/s.

2. The process according to claim 1, wherein the monomer a) has at least one acid group.

3. The process according to claim 2, wherein the acid groups of the monomer a) are neutralized at least partly.

4. The process according to claim 1, wherein the monomer solution comprises less than 0.5% by weight of the crosslinker b) based on the monomer a).

5. The process according to claim 1, wherein the organic peroxide of initiator c) is a hydroperoxide.

6. The process according to claim 1, wherein the further initiator d) is an azo compound and/or a photoinitiator.

7. The process according to claim 1, wherein the droplets have a mean diameter of at least 200 μm.

8. The process according to claim 1, wherein at least 90%, by weight, of the droplets have a diameter of at least 100 μm.

9. The process according to claim 1 wherein the molar ratio of initiator c) to further initiator d) is 16:1 to 32:1.

10. The process according to claim 1 wherein the organic peroxide of the initiator c) is selected from the group consisting of acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcycloahexy) peroxydicarbnate, dimyristyl peroxydicarbonate, diacetyl peroxydicarbonate, allyl perester, cuyml peroxyneodecanoate, tert-butyl per-3,5,5-trimethylhexanoate, acetylcyclohexylsulfonyl peroxide, dilauryl peroxide, dibenzoyl peroxide, and tert-amyl perneodecanoate.

11. The process according to claim 1 wherein the initiator c) consists of hydrogen peroxide and tert-butyl hydroperoxide.

* * * * *